(No Model.) 2 Sheets—Sheet 1.

F. SLATER.
CAR BRAKE ADJUSTER.

No. 509,958. Patented Dec. 5, 1893.

Witnesses.
Anna V. Faust.
Fred S. Hunt.

Inventor.
Frank Slater
By Benedict Morsell
Attorneys.

(No Model.) 2 Sheets—Sheet 2.
F. SLATER.
CAR BRAKE ADJUSTER.
No. 509,958. Patented Dec. 5, 1893.
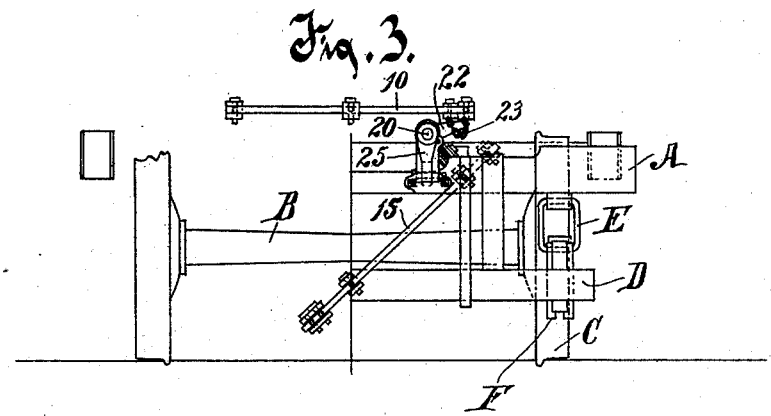
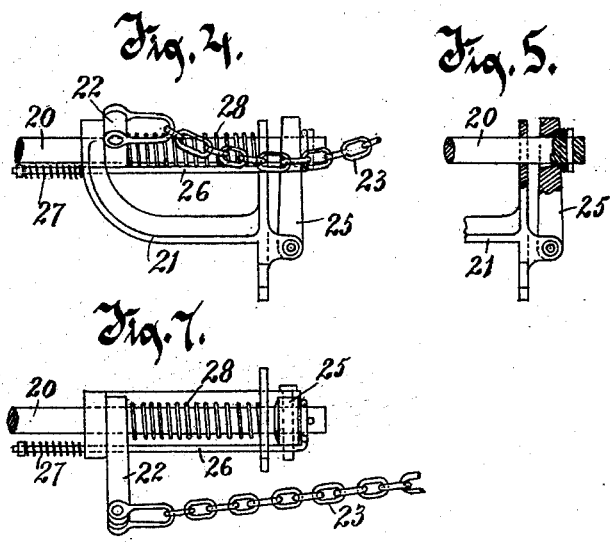
Witnesses.
Inventor.
Frank Slater
By Benedict Morsell
Attorneys.

UNITED STATES PATENT OFFICE.

FRANK SLATER, OF KAUKAUNA, WISCONSIN.

CAR-BRAKE ADJUSTER.

SPECIFICATION forming part of Letters Patent No. 509,958, dated December 5, 1893.

Application filed September 25, 1893. Serial No. 486,376. (No model.)

*To all whom it may concern:*

Be it known that I, FRANK SLATER, of South Kaukauna, in the county of Outagamie and State of Wisconsin, have invented a new and useful Improvement in Automatic Car-Brake Adjusters, of which the following is a description, reference being had to the accompanying drawings, which are a part of this specification.

My invention is especially adapted for use in connection with automatic car brakes, and I have shown it with car brake mechanism of the form in common use with the Westinghouse air brakes.

The invention consists of the device and its parts, as hereinafter described and claimed, or their equivalents.

Figure 1:
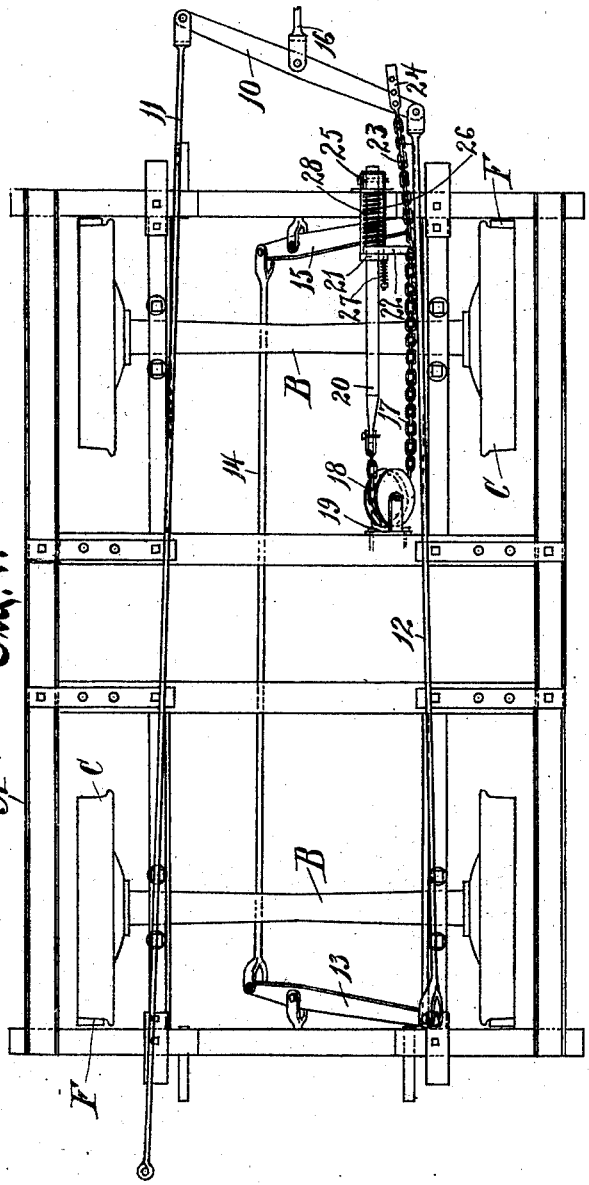
Figure 2:
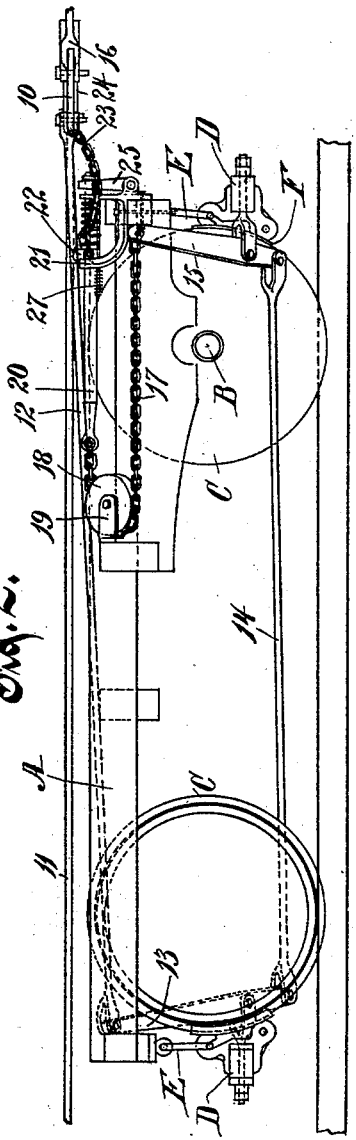

Figure 1, is a plan of a car truck and brake mechanism, with my improved device thereon. Fig. 2, is a side elevation of the same car truck and brake mechanism, with my improved device. Fig. 3, is an end view, parts being broken away, of the car truck, and a portion of my improved device therewith. Figs. 4, 5, 6 and 7 are details.

In the drawings a single truck substantially such as is in use on cars at the present time, is shown, which consists of the frame A, mounted on axles B B provided with wheels C C. Brake beams D D are suspended so as to oscillate freely, by links E E, from the frame A at the front and rear respectively of the two sets of car wheels. Brake shoes F F mounted on the brake beams, are adapted to contact with the tread of the wheels C.

For actuating the brakes a system of levers and connecting rods is provided, consisting of the power-actuated lever 10, one extremity of which is pivoted to the hand-brake rod 11, which is normally held against endwise movement by being secured to the stem of the car hand-brake, the other extremity of lever 10 being pivoted to the live-lever connecting rod 12, which is pivoted to the live-lever 13, which lever is medially pivoted to a brake beam D, and at its other extremity is pivoted to the dead-lever connecting rod 14, the rod at its other extremity being pivoted to the dead-lever 15, this lever being in turn pivoted medially to the other brake beam, and at its other extremity being connected to the holding chain 17 of my slack-taking-up device.

The rod 16 pivoted to the lever 10 medially, is connected to the reciprocating piston of a compressed air cylinder, or other device for actuating the lever 10. The foregoing devices are substantially such as are in common use, and form no part of my invention except only so far as they are combined and coact with or are acted upon by my improved device.

For adjusting the mechanism of a car brake properly at first, when it is being attached to a car, and for taking up such slack as thereafter occurs by reason of the wear of the parts and particularly by reason of the wear of the brake shoes, and thereby, in those cases where brakes are actuated by reciprocating pistons, regulating the travel of the piston, or in other words adjusting the brake mechanism to the properly adjusted travel of the piston, I provide the device hereinafter specifically described.

A holding chain 17, one extremity of which is attached to the dead-lever 15 runs over a sheave 18 mounted in a bracket or block 19 fixed on the frame, and at its other extremity is connected to a rod or bar 20, mounted movable endwise in the two arms of a bracket 21 fixed on the truck frame. It will be evident that the slack in the brake mechanism can be taken up by drawing the bar 20 forwardly (toward the right in Fig. 1) and for this purpose an arm or straining dog 22 is provided, which arm has a transverse aperture in one extremity, through which the bar 20 moves freely when the arm is at a right angle to the bar. The other extremity of the arm is connected by a straining chain 23 and an elongated clevis 24, to the live-lever 10. The location and arrangements of the parts are such that as the lever 10 is drawn forward (toward the right in Fig. 1) the movement, as soon as it exceeds such as is necessary to take up the slight lost motion there is by reason of looseness of parts, will first tilt the dog 22 so that it will grip the bar 20 and will then carry it forward co-extensively with the excess of corresponding movement of the lever 10. Another arm or holding dog 25 hinged on the bracket 21 at a little distance in front of its front arm, is provided with a transverse aperture through which the bar 20 moves freely when the dog is tilted slightly toward the front. A rod 26, one extremity of which is looped loosely about the bar 20 in front of the dog 25, slides freely in bearings therefor in the bracket 21, and an extension spring 27, coiled about the rod between a nut on its extremity and the bracket 21, serves to hold the dog 25 yieldingly rearwardly or toward the bracket 21. By this construction, the bar 20 slides freely forwardly (toward the right in Fig. 1) through the dog 25, but when it is released and starts to move rearwardly (toward the left) the dog 25 by reason of friction on the bar or under the action of the spring 27 or both, is tilted slightly rearwardly (toward the bracket) and thereby clutches the bar and holds it against further movement rearwardly, thus obviating slack in the brake mechanism. This operation is repeated so often as, and whenever in setting the brakes the movement of the lever 10 is greater than such as is just sufficient to take up the lost motion occurring by reason of slight looseness in the parts of the brake mechanism. An expansion spring 28 coiled about bar 20, interposed between the front arm of bracket 21 and the dog 22, is adapted to hold the dog 22 yieldingly up to its work.

The elongated clevis 24 is provided with a series of apertures, by which it can be so attached to the lever 10 adjustably, as to regulate the length of the straining or pulling chain 23, thereby adjusting the travel of the piston of the cylinder to any desired extent.

What I claim as my invention, and desire to secure by Letters Patent, is—

1. The combination with a car-brake mechanism comprising a plurality of levers and connecting rods, of an adjusting device including a reciprocable bar connected to a lever of the brake mechanism, and a tilting and movable dog connected at one extremity to the brake actuating lever and at the other extremity arranged to grip the bar and move it when tilted and moved by the brake-actuating lever, substantially as described.

2. The combination with car-brake mechism comprising a plurality of levers and connecting rods, of an adjusting device including a reciprocable bar connected to a lever of the brake mechanism, a tilting and movable dog connected at one extremity to the brake-actuating lever and at the other extremity arranged to grip the bar, and move it when tilted and moved by the brake-actuating lever, and a holding dog arranged to permit the reciprocating bar to pass freely in one direction but adapted to grip releasably and hold the bar against movement in the other direction, substantially as described.

3. The combination with car-brake mechanism, comprising levers and connecting rods, of a holding chain connected at one extremity to a lever of the brake mechanism, a bar reciprocable in a fixed support, to which bar the holding chain is attached, a tilting and movable dog loose on the bar, a straining chain connecting the dog to the brake-actuating lever, adapted to tilt the dog and move it and the bar together endwise of the bar, and a spring interposed between the dog and a fixed support adapted to retrieve the dog when released from strain, substantially as described.

4. The combination with car-brake mechanism comprising levers and connecting rods, of a holding chain connected at one extremity to a lever of the brake mechanism, a bar reciprocable in a fixed support to which bar the holding chain is attached, a tilting and movable dog loose on the bar, a straining chain connecting the dog to the brake-actuating lever adapted to tilt the dog and move it and the bar together endwise of the bar, and a holding dog hinged on a fixed support and arranged to permit the reciprocable bar to pass freely in one direction and to grip and hold the bar releasably against movement in the other direction, substantially as described.

5. The combination with car-brake mechanism comprising levers and connecting rods, of a holding chain connected at one extremity to a lever of the brake mechanism, a bar reciprocable in a fixed support to which bar the holding chain is attached, means for gripping and moving the reciprocable bar in one direction, a holding dog hinged on a fixed support arranged to permit the reciprocable bar to move freely in one direction and to grip and hold the bar releasably against movement in the other direction, and a spring-actuated rod adapted to hold the holding dog yieldingly up to its work, substantially as described.

6. In mechanism of the character described, the combination of a bar reciprocable endwise in a fixed support, a tiltable straining dog adapted to grip the bar, a straining chain attached to the dog, an actuating lever and a clevis terminating the chain which clevis is provided with a series of apertures adapted for securing it adjustably to the lever, substantially as described.

7. In a brake-adjusting device, the combination with a truck frame and brake mechanism comprising a plurality of levers and connecting rods, of a bar reciprocable endwise in a fixed support, a sheave in a fixed support, a chain running over the sheave and connecting one extremity of the reciprocable bar to an arm of a brake lever, a tiltable straining dog, a straining chain connecting the dog to the brake-actuating lever, a retrieving spring 28, a holding dog 25, and a spring-actuated retaining rod 26, substantially as described.

In testimony whereof I affix my signature in presence of two witnesses.

FRANK SLATER.

Witnesses:
ROBERT QUAYLE,
OLAF OLSON.